W. H. SMILEY.
Improvement in Subsoil Attachment for Plows.

No. 131,636.            Patented Sep. 24, 1872.

UNITED STATES PATENT OFFICE.

WILLIS H. SMILEY, OF BENTONVILLE, ARKANSAS.

IMPROVEMENT IN PLOWS.

Specification forming part of Letters Patent No. 131,636, dated September 24, 1872.

*To all whom it may concern:*

Figure 1:
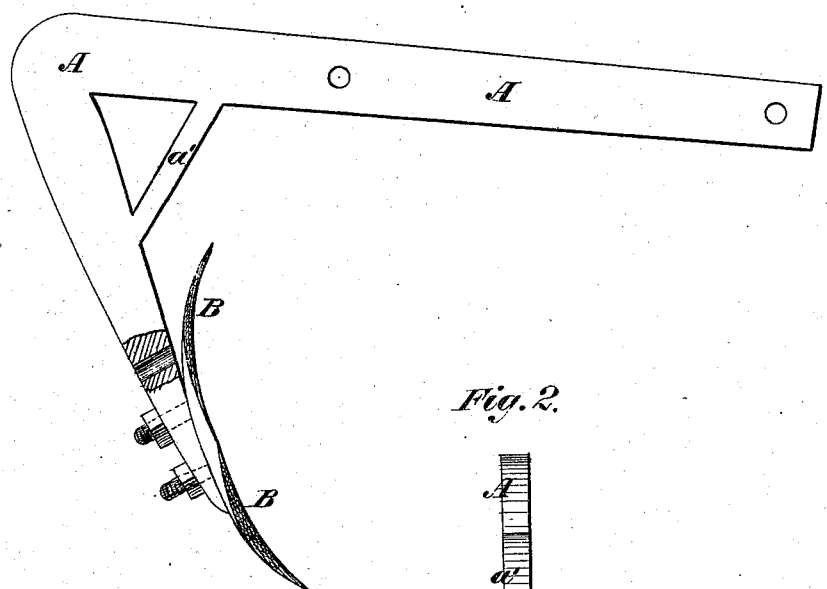
Figure 2:

Be it known that I, WILLIS H. SMILEY, of Bentonville, in the county of Benton and State of Arkansas, have invented a new and useful Improvement in Subsoil Attachment for Plows, of which the following is a specification:

In the accompanying drawing, Figure 1 is a side view of my improved subsoil attachment, and Fig. 2 is a front view of the same.

Similar letters of reference indicate corresponding parts.

My invention has for its object to furnish an improved subsoil-plow, which may be attached to any ordinary plow, whether used for preparing land to receive the seed, or for cultivating crops, and which shall be so constructed that it may be readily adjusted to work deeper or shallower in the ground, as may be required; and it consists in the subsoil-plow constructed substantially as herein described to adapt it for attachment to a plow-beam.

A is a short iron beam, the rear part of which is bent downward at a proper inclination to adapt it to serve as a standard to receive the plow B. The beam A is strengthened at its angle by a brace, a', as shown in Fig. 1. The plow B is made with a point at each end, so that when one point becomes dull the plow may be detached and reversed, so that the plow need be sent to the shop to be sharpened only one-half as often as a single-point plow.

The plow B is secured in place by two bolts, which pass through holes in the lower end of the upright part or standard of the beam A, several holes being formed for said bolts, so that the plow may be conveniently raised and lowered as desired. In the horizontal part of the beam A are formed two holes to receive the bolts by which said beam is secured to the beam of an ordinary plow. Several holes are formed in the plow-beam to receive the bolts that secure the beam A to it, so that the subsoil-plow may be adjusted to run deeper or shallower in the ground, as may be desired.

In using the subsoil attachment A B the beam A is inserted between the handles and along the side of the beam of the plow, bolted to said beam, and adjusted so as to open up and loosen the ground in the bottom of the furrow opened by said plow.

Having thus described my invention, I claim as new and desire to secure by Letters Patent—

The subsoil attachment A a' B, constructed as described, and adapted to be attached between the handles and alongside the beam of an ordinary turn-plow, as described.

WILLIS H. SMILEY.

Witnesses:
 B. F. DAVIS,
 S. M. TARKINGTON.